United States Patent [19]
Jurewicz et al.

[11] Patent Number: 5,921,090
[45] Date of Patent: Jul. 13, 1999

[54] CONTROL METHOD FOR A CRYOGENIC REFRIGERATION SYSTEM

[75] Inventors: Romuald Martin Jurewicz, St. Louis Park; Herman H. Viegas, Bloomington, both of Minn.

[73] Assignee: Thermo King Corporation, Minneapolis, Minn.

[21] Appl. No.: 08/792,564

[22] Filed: Jan. 31, 1997

Related U.S. Application Data

[63] Continuation-in-part of application No. 08/560,919, Nov. 20, 1995, Pat. No. 5,598,709.

[51] Int. Cl.$^6$ ........................................................ F17C 9/02
[52] U.S. Cl. ................................. 62/50.2; 62/216; 62/223
[58] Field of Search ........................... 62/50.2, 216, 222, 62/233

[56] References Cited

U.S. PATENT DOCUMENTS

| | | | |
|---|---|---|---|
| 5,203,179 | 4/1993 | Powell | 62/216 |
| 5,410,890 | 5/1995 | Arima | 62/228.4 |
| 5,730,216 | 3/1998 | Viegas et al. | 62/50.2 |

OTHER PUBLICATIONS

"Special Tools And Chips Make Fuzzy Logic Simple," *EDN–Technology Feature*, Jul. 6, 1992, pp. 68–76.

*Primary Examiner*—Ronald Capossela
*Attorney, Agent, or Firm*—Michael M. Gnibus

[57] ABSTRACT

A control method is provided for a cryogenic refrigeration system having an evaporator-heater coil, an electronically controlled valve for regulating the amount of cryogen to the coil, and a vapor motor driven by the cryogen that is coupled to both an alternator for recharging a battery, and a fan for generating a discharge air flow through the coil and into a conditioned space. The shaft rpms of the vapor motor is determined by a rectified output of the alternator, and the electronically controlled valve is incremented or decremented so that the shaft rpms stay above a preselected amount sufficient to both to recharge the battery of the system, and to circulate sufficient air in the conditioned space to avoid undesirable temperature non-uniformities therein. The pressure of the cryogen in the system is further continuously measured, and the electronically controlled valve is incremented or decremented in order to maintain a sufficient pressure to maintain the cryogen in a gaseous state. Finally, the difference between the measured temperature of the return air in the conditioned space and a set point temperature is determined, as well as the rate of change of the measured temperature and the acceleration or deceleration associated with the rate of temperature change. The electronically controlled valve is further incremented or decremented in accordance with a fuzzy logic routine partially on the basis of the temperature difference, the temperature rate of change, and the acceleration or deceleration of the temperature rate of change dependent upon how close the measured temperature is with respect to the set point temperature.

19 Claims, 7 Drawing Sheets

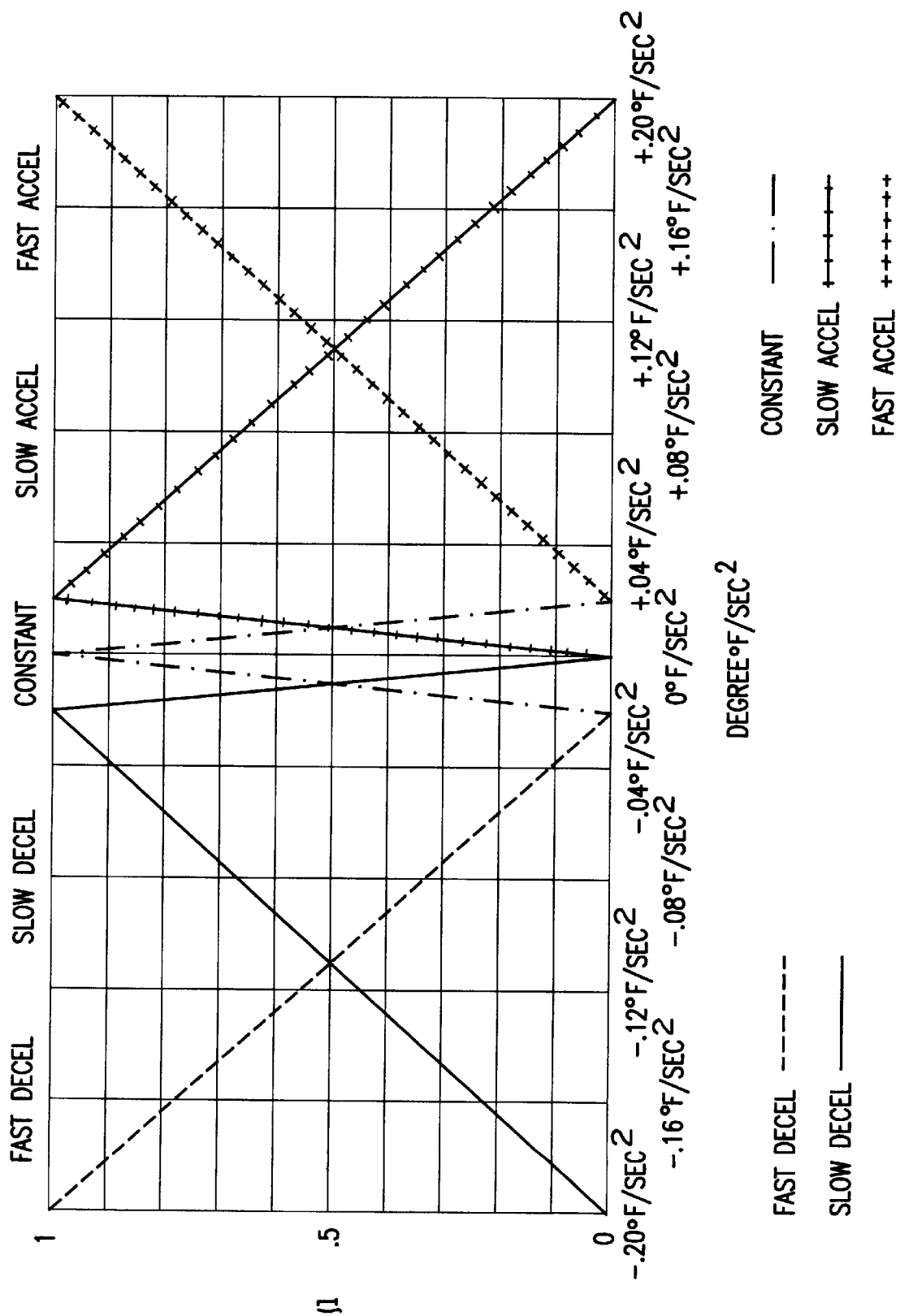

CONTROL METHOD FOR A CRYOGENIC REFRIGERATION SYSTEM

THIS IS A CONTINUATION IN PART OF Ser. No. 08/560,919 filed Nov. 20, 1995 now U.S. Pat. No. 5,598,709.

BACKGROUND OF THE INVENTION

This invention is generally concerned with control methods, and is specifically concerned with a control method for use with a cryogenic refrigeration system of a type having a vapor powered motor for driving both an alternator for recharging the system battery, and a fan for blowing air through an evaporator-heater coil.

Air conditioning and refrigeration systems conventionally utilize a chlorofluorocarbon (CFC) refrigerant in a mechanical refrigeration cycle. Because of the suspected depleting effect of CFCs of stratospheric ozone ($O_3$), practical alternatives to the use of CFCs in air conditioning and refrigeration systems are being sought. One such alternative is a cryogenic refrigeration system utilizing either liquid carbon dioxide or liquid nitrogen. Such a system is particularly attractive because, in addition to eliminating the need for CFC refrigerants, it also eliminates the need for a refrigerant compressor and the diesel engine or other prime mover that drives it.

An example of such a cryogenic refrigeration system is described and claimed in U.S. patent application Ser. No. 08/501,372, filed Jul. 12, 1995, and assigned to the Thermo King Corporation now U.S. Pat. No. 5,730,216 This particular system is preferably powered by liquid carbon dioxide, and includes an evaporator heater coil, an electronically controlled valve for modulating the amount of cryogenic gas that flows through the coil, and a vapor motor driven by the cryogenic gas that flows through the coil. The vapor motor is coupled to both an alternator for recharging the battery, and a fan for generating an air flow through the coil into a conditioned space. To allow the system to be operated in a heating mode, a vaporizer and superheater device is provided for heating the cryogenic gas to approximately 500° F., as well as a set of solenoid operated valves for routing such superheated gas through the evaporator-heater coil in order to either defrost the coil, or heat the conditioned space.

For such a cryogenic refrigeration system to perform effectively, three basic criteria must be fulfilled. First, the system should rapidly achieve its temperature setpoint goal within a conditioned space with the expenditure of only a minimum amount of cryogen, since the amount of cryogen that can be carried in such a system is limited, while avoiding undesirable top-freezing of goods stored in the conditioned space. Secondly, the vapor motor of the system should be operated at sufficiently high speed to insure that the alternator coupled thereto effectively recharges the system battery, and the fan powered by the motor circulates a sufficient amount of air to avoid undesirable temperature nonuniformities throughout the conditioned space. Thirdly, the system should be operated in such a manner that temperature control of the conditioned space is arrive at quickly and smoothly, without subjecting the vapor motor to damage by flooding it with cryogen or subjecting it to solid $CO_2$. This last criteria is particularly important, as cryogenic system are much more susceptible to damage as a result of an unwanted phase change of the refrigerant than mechanical refrigeration systems.

Clearly, there is a need for a method for controlling such a cryogenic refrigeration system so that only a minimum amount of cryogen is used in achieving the temperature set point within the conditioned space. It would further be desirable if such a method ran the cryogenically powered motor at speeds which were always sufficient for the alternator coupled thereto to adequately recharge the system battery, and the fan coupled thereto to circulate enough air in the conditioned space to avoid undesirable temperature non-uniformities therein. Such a control method should also be capable of modulating the amount of cryogenic gas entering the vaporizer and superheater device so that the gas exiting the vaporizer coil assembly was always above the freezing point of water, and the gas exiting the superheater gas assembly was approximately 500° F., as the fulfillment of these criteria avoids the formation of unwanted water-ice on the vaporizer coil, and provides adequate heating without adverse metallurgical effects on the evaporator-heater coil. Finally, such a method should be capable of quickly and smoothly achieving a desired temperature set point without flooding the evaporator-heater coil or creating solid $CO_2$ in the circuit, either condition of which could damage the vapor motor by subjecting it to liquid or solid cryogen.

SUMMARY OF THE INVENTION

Generally speaking, the invention is a control method for a cryogenic refrigeration system of the type having an evaporator-heater coil, an electronically controlled valve for regulating a mass flow of cryogen to the coil, a vapor motor driven by the cryogen that is coupled to both an alternator for recharging the battery, and a fan for generating discharge air through the coil into a conditioned space. In the first step of the method, the shaft rpms of the vapor motor is determined by rectifying the output of the alternator, and counting the number of DC pulses per second generated thereby. The electronically controlled valve is then incremented or decremented so that the shaft rpms are above a preselected amount sufficient both to recharge the battery of the system, and to circulate a sufficient amount of air in the conditioned space via the motor driven fan to avoid any substantial temperature non-uniformities therein. Concurrently with these steps, the pressure of the cryogen entering the heater-evaporator coil and the vapor motor is continuously monitored. The electronically controlled valve is further incremented or decremented to maintain a pressure sufficient to maintain the cryogen entering the coil and the vapor motor at a gaseous state.

Further concurrently with these steps, the temperature of return air in the conditioned space is periodically monitored, and compared with a desired set point temperature. The electronically controlled valve is periodically incremented or decremented by an amount determined by the difference between the measured temperature and the set point temperature in order to bring the conditioned space to the set point temperature and maintain it there. In order to achieve and maintain temperature set points smoothly, the method of the invention further includes the steps of periodically determining the rate of change of the temperature of the discharge air, as well as the acceleration or deceleration of this rate of change. The incrementing or decrementing of the electronically controlled valve is then determined partially on the basis of the difference between the measured temperature and the set point temperature, partially on the rate of change of the measured temperature, and partially on the deceleration or acceleration of the measured rate of change, the relative weight of these factors depending upon how close the measured temperature is to set point.

In the preferred implementation of the method, the electronically controlled valve is periodically incremented or decremented by an amount that is primarily determined by the difference between the measured temperature of the return air in the conditioned space, and the desired set point temperature when this difference is between about 45° F. and 5° F. When this temperature is between about 5° F. and 2° F., the electronically controlled valve is periodically incremented or decremented primarily on the basis of the measured rate of change of the temperature of the return air. Finally, when the temperature difference is 2° or less, the electronically controlled valve is periodically incremented or decremented primarily on the basis of the measured deceleration or acceleration in the rate of temperature change.

In the preferred embodiment, the temperature of the return air is periodically measured every 0.10 seconds and the electronically controlled valve is periodically incremented or decremented every 0.10 seconds.

BRIEF DESCRIPTION OF THE SEVERAL FIGURES

Figure 4:
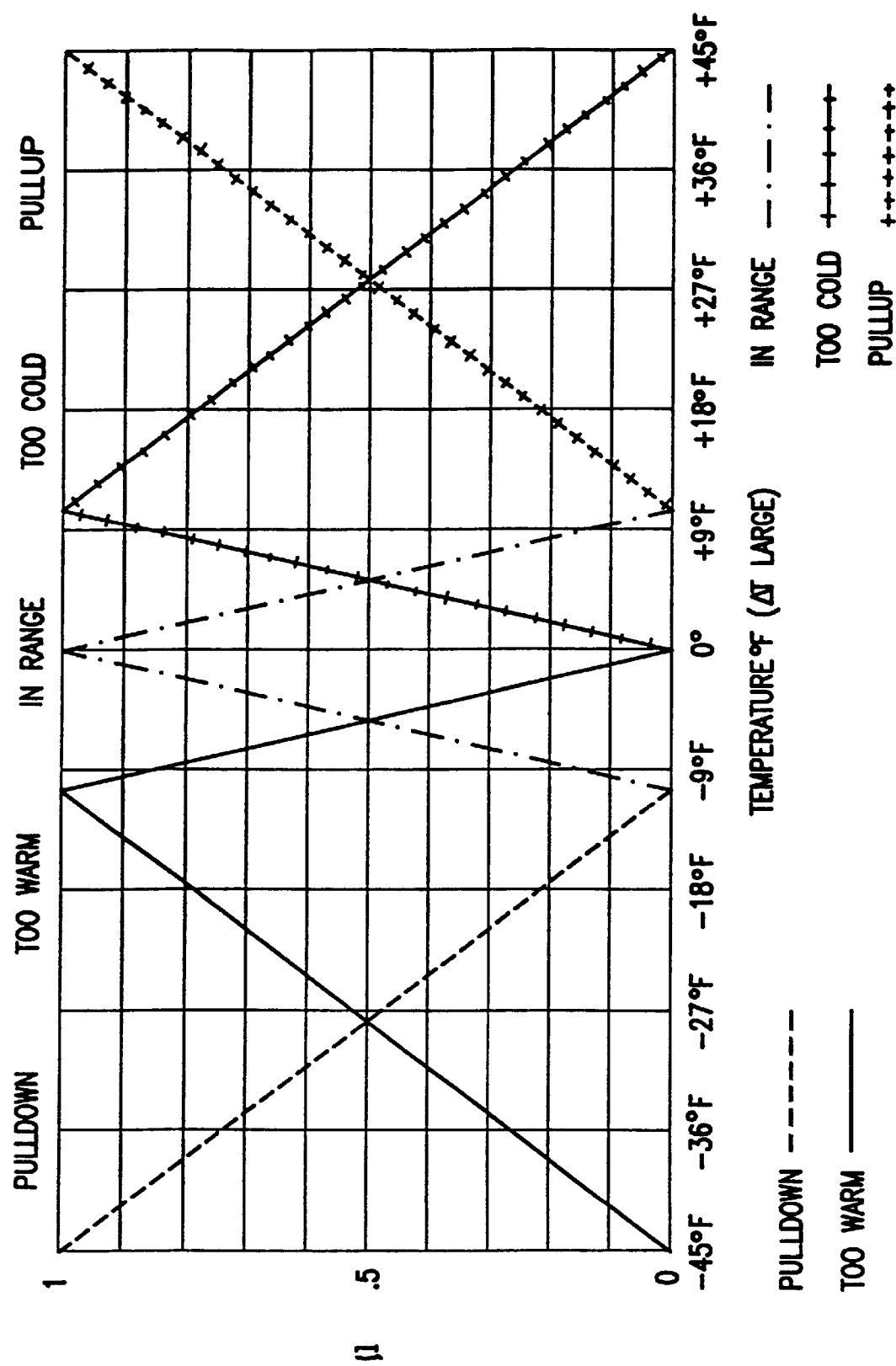
Figure 5:
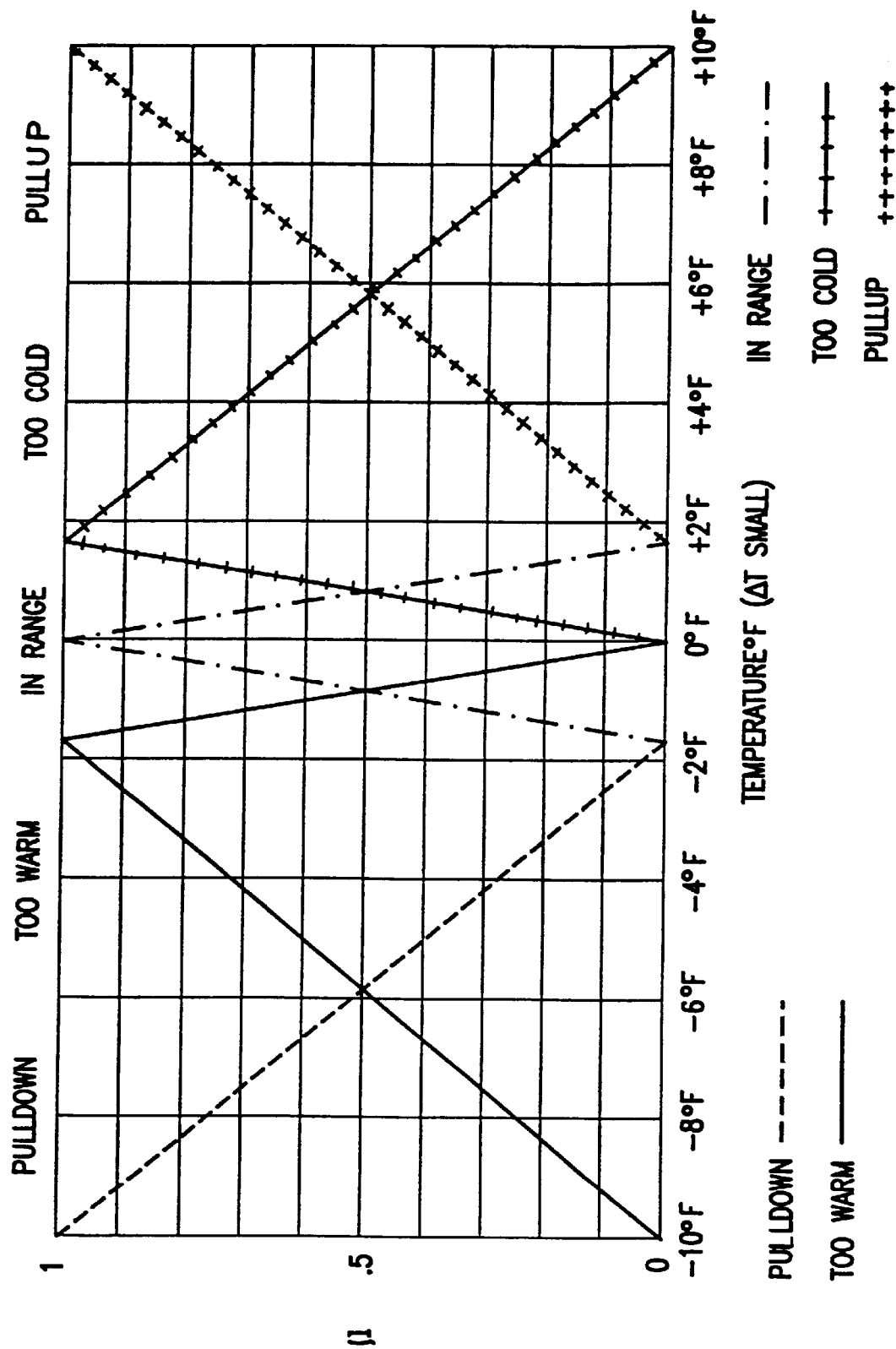
Figure 6:
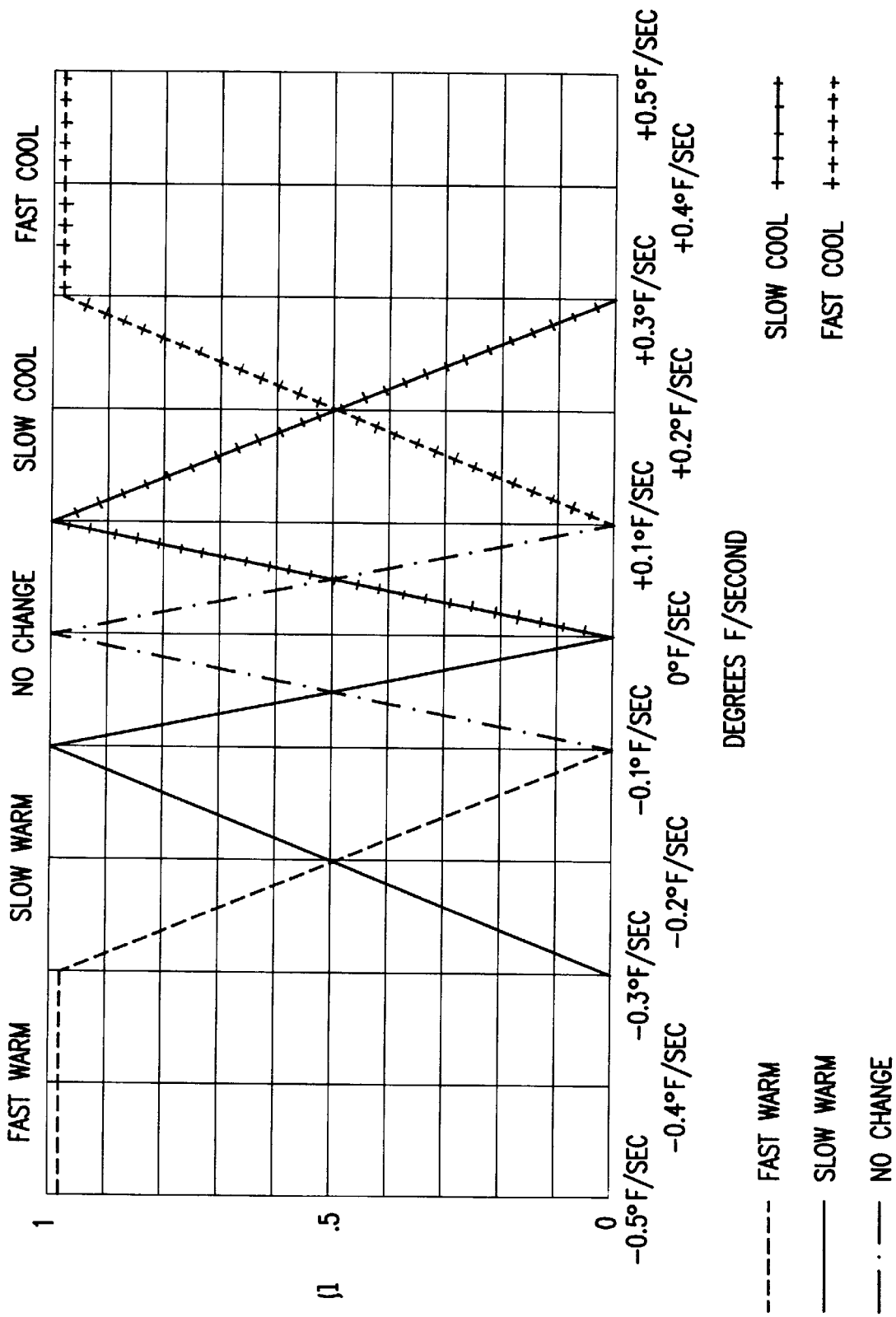

FIGS. 4 and 5 are schematic diagrams of the membership function between "change flow valve 10 a lot" and "change flow valve 10 a little" and large (±45° F.) and small (±10° F.) ΔTs between a selected set point temperature and the measured temperature of the return air in conditioned space 4, respectively;

FIG. 6 is a schematic diagram of the membership function between change flow valve 10 "a lot" versus "a little" and the measured rate of change of the temperature of the return air in conditioned space 4, and FIG. 7 is a schematic diagram of the membership function between change flow valve 10 "a lot" versus "a little" and the measured acceleration or deceleration in the rate of change of the measured temperature of the return air in conditioned space 4.

DETAILED DESCRIPTION OF THE PREFERRED EMBODIMENT

Figure 1:
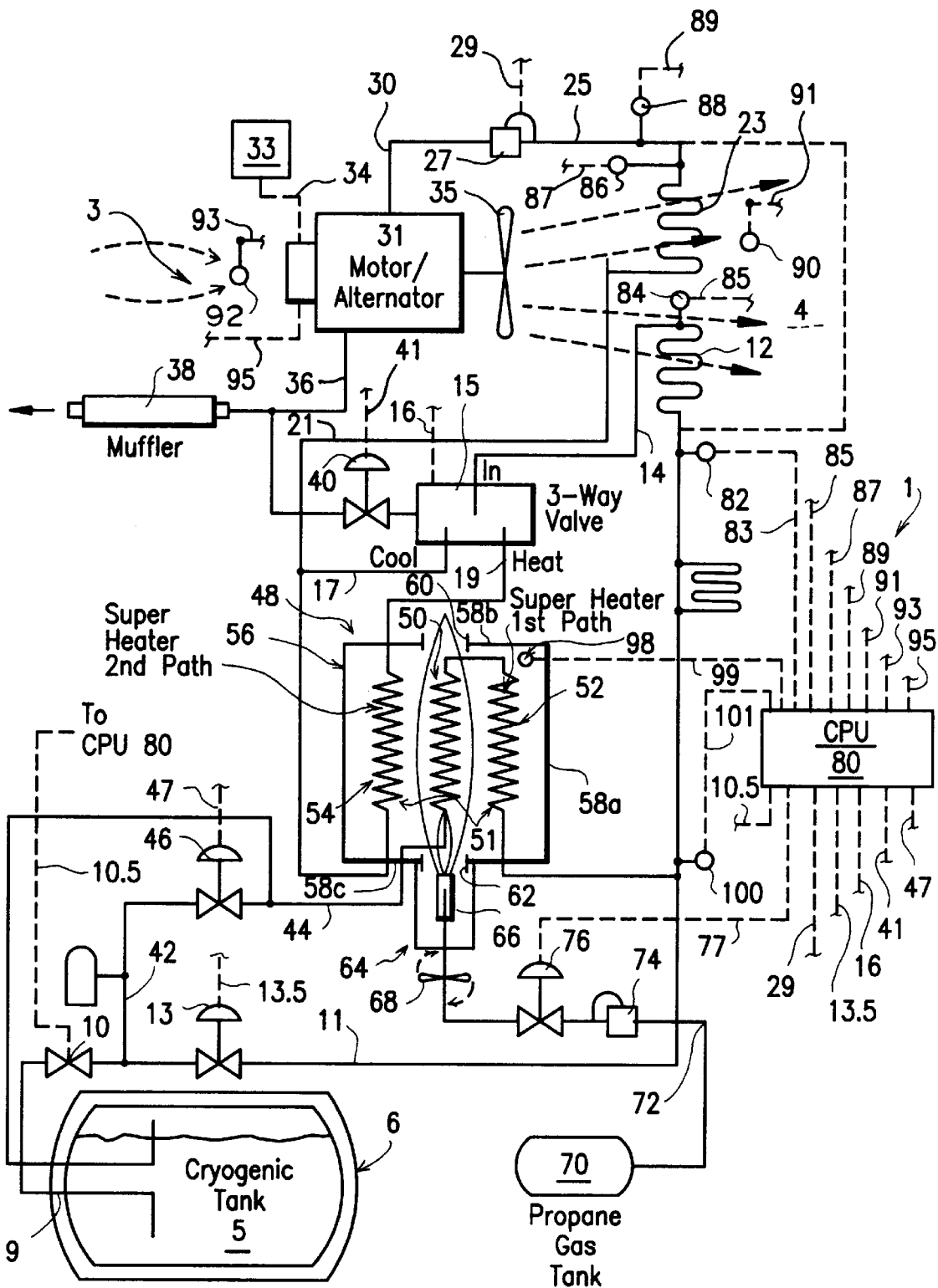
FIG. 1 is a schematic diagram of a cryogenic refrigeration system that incorporates the control system of the invention.

With reference now to FIG. 1, wherein like numerals designate like components throughout both the Figures, the control system 1 is particularly adapted for use with a cryogenic refrigeration system 3 that utilizes a liquid cryogen such as liquid $CO_2$ or liquid nitrogen. While the principal function of the cryogenic refrigeration system 3 is to cool a conditioned cargo space 4, it can also generate heat when necessary to maintain a desired set point temperature within the space 4. To facilitate a better understanding of the function of the control system 1 in the context of such a refrigeration system 3, descriptions of both the refrigeration circuit and the heating circuit of the system 1 will be given. These circuits are also described in U.S. patent application Ser. No. 08/501,372 filed Jul. 12, 1995, and assigned to the Thermo King Corporation now U.S. Pat. No. 5,730,216, the entire specification of which is hereby incorporated by reference.

The refrigeration circuit of the system 1 begins with a liquid supply line 9 for withdrawing liquid cryogen 5 from the insulated tank 6. The flow of cryogen through line 9 is modulated by an electronic expansion valve 10 that is in turn controlled by a microprocessor 80 via electrical line 10.5 that forms part of the control system 1. Liquid supply line 9 is connected to inlet conduit 11 which introduces liquid cryogen into a first evaporator coil 12 that can also function as a heater coil when the system 1 is switched to a heat mode of operation. A mode valve 13 disposed in the inlet conduit 11 controls the flow of liquid cryogen into the evaporator coil 12, and is normally open during the refrigeration mode of the system 1. Expanding cryogen exiting the first evaporator coil 12 is expelled out of outlet conduit 14 into a three way valve 15. The three way valve 15 has both a cooling outlet 17 and a heating outlet 19, depending upon the mode of operation of the system 1. In the cooling mode of operation, the three way valve 15 routes all of the expanding cryogen it receives from the first evaporator coil 12 through cooling outlet 17, and from thence into the inlet conduit 21 of the second evaporator coil 23. Like the first evaporator coil 12, the second evaporator coil 23 can also be used as a heating coil during the heating mode of the system 1. Because the heating outlet 19 is completely shut off during the cooling mode of operation, virtually none of the expanding cryogen will flow backwards through the conduit 21 into the cryogenic vaporizer and superheater device 1. Expanded cryogen (which is now in a completely gaseous state) exits the outlet conduit 25 of the second evaporator coil 23. Conduit 25 includes a back pressure regulator valve 27 which is modulated by the control system 1 via electrical line 29 to maintain a sufficient back pressure (above 80 psi) in the line to insure that the cryogen remains in a completely gaseous state. This is of particular importance when liquid $CO_2$ is used as the cryogen, since $CO_2$ can coexist in all three phases (i.e., solid, liquid, and gas) under certain temperature and pressure conditions, and since the solid phase can seriously interfere with the operation of the motor/alternator 31. After passing through the back pressure regulator valve 27, the gaseous cryogen enters the previously mentioned motor/alternator 31 via motor inlet conduit 30. The motor/alternator is electrically connected to a battery recharger 33 via electrical line 34.

The heating circuit of the system 3 begins with the cryogen line 42 having an inlet connected to liquid cryogen supply line 9, and an outlet connected to an inlet conduit 44 leading into the vaporizer and superheater device 3 of the invention. A mode valve 46 is positioned between inlet conduit 44 and the cryogenic line 42 for admitting cryogen to the vaporizer and superheater device 48 when the refrigeration system 3 is in a heating mode, whereupon valve 13 is closed to prevent liquid cryogen from flowing into the evaporator coils 12,23.

The vaporizer and superheater device 48 generally comprises a vaporizer coil assembly 50 and a superheating coil assembly 51 which includes first and second superheating coils 52 and 54. While the coils 52 and 54 are shown as being structurally apart from one another in the schematic diagram of FIG. 1 in order to more clearly indicate the flow patterns of the cryogen through the device 1, these coils 52 and 54 are in fact helically intertwined in order to achieve an advantageous compactness. Both the vaporizer coil assembly 50 and the superheating coil assembly 51 are contained within a housing 56 having side, upper and lower insulated walls 58a,b,c. The upper wall 58b is generally circular in shape, and includes a circular exhaust outlet 60 around its center. The bottom wall 58c is likewise circular, and includes a circular flame inlet 62 around its center for receiving the flames of a propane burner 64.

Propane burner 64 is comprised of a combustion nozzle 66, a blower 68 for supplying air for combustion and for directing flames generated by the nozzle 66 into the inlet 62 of the housing 56, and a propane tank 70 for supplying the nozzle 66 with a flow of propane or other fossil fuel. A combustion nozzle 66 and the propane tank 70 are interconnected via fuel line 72, which in turn includes a regulator valve 74 for modulating the flow of propane to the nozzle 66, as well as a fuel shut-off valve 76 for completely stopping a flow of fuel to the nozzle 66. Valve 76 is connected to the control processing unit (CPU) 80 via electrical line 77 as indicated.

Turning now to a detailed description of the control system 1, a key component of the system 1 is a central processing unit 80 which may be a Micro P-B microprocessor manufactured by the Thermo King Corporation located in Minneapolis, Minn. The system 1 also includes a coil inlet temperature sensor 82 for measuring the temperature of the refrigerant entering the first evaporator coil 12. The output of the sensor 82 is connected to the input of the CPU 80 via electrical line 83. A coil temperature sensor 84 is provided for measuring the average temperature of the evaporator coils 12,23. The output of sensor 84 is connected to the CPU 80 via electrical line 85. A coil outlet temperature sensor 86 is provided in the system 1 for measuring the temperature of the refrigerant exiting the evaporator coil 23. The output of this sensor 86 is connected to the input of the CPU 80 via electrical line 87. The system 1 also includes a coil outlet pressure sensor 88 for measuring the pressure of the cryogen in the conduit 25. The output of the sensor 88 is connected to the input of the CPU 80 by way of the electrical line 89.

The system 1 also has a discharge air temperature sensor 90 for measuring the temperature of the air discharged into the conditioned space 4. The output of the sensor 90 is connected to the input of the CPU 80 by way of electrical line 91. A return air temperature sensor 92 is provided for measuring the temperature of the air returned from the conditioned space 4. The output of this sensor 92 is transmitted into the input of the CPU 80 through electrical line 93. The AC output of the alternator 31 is connected to the input of the CPU by way of electrical line 95 so that the CPU 80 can determine the rpms of the motor/alternator 31. Further, the control system 1 includes both a vaporizer coil assembly temperature sensor 98 and superheating coil temperature sensor 100 whose outputs are connected to the input of the CPU 80 via electrical lines 99 and 101, respectively. The purpose of the sensor 98 is to determine whether or not the cryogen exiting the coil assembly 50 is warm enough to avoid the formation of a film of ice and water on the superheating coils 52,54, while the purpose of the temperature sensor 100 is to determine whether or not the cryogen exiting the first superheating coil 52 is over 500° F.

As has been previously indicated, the input of the CPU 80 of the control system 1 receives information from temperature sensors 82,84,86, pressure sensor 88, temperature sensors 90 and 92, motor/alternator 31 and temperature sensors 98 and 100 via the electrical lines 85, 87, 89, 91, 93, 95, 99, and 101. It proceeds to process this information through an algorithm and controls the positions of the cryogen flow valve 10, the mode valve 13, the three-way valve 15, the back pressure valve 27, the recirculation valve 40, the mode valve 46, and the propane shut-off valve 76 via electrical lines 10.5, 13.5, 16, 29, 41, 47, and 77.

When the CPU 80 decides to implement the cooling mode of the refrigeration system 3, it opens mode valve 13 and closes mode valve 46. This action allows cryogen from the tank 6 to enter the first evaporator-heater coil 12 via conduit 11 while preventing the cryogen from entering the vaporizer and superheater device 48 via conduit 44. The CPU 80 further shifts the three-way valve 15 into its "cool" position which allows cryogen exiting the first evaporator-heater coil 12 to recirculate via conduit 17 and 21 into the second evaporator-heater coil 23. Based on the reading of the pressure sensor 88, the CPU proceeds to modulate the position of the back pressure valve 27 so that cryogenic gas exiting the second evaporator-heater coil 23 via conduit 25 will be pressurized to a level prior to entering the motor alternator 21 that will insure that the cryogen is in a completely fluid state (i.e., free of solid $CO_2$ or other solids). Additionally, the CPU 80 will close recirculation valve 40 so that all of the cryogenic gas passing through the motor/alternator 31 exits the system 3 via conduit 36 and muffler 38. Finally, in this mode of operation, the CPU 80 closes the fuel on/off valve 76 to the vaporizer and superheater device 48 as there is no need to operate the device 48 in this mode. CPU 80 then proceeds to continuously modulate electronic valve 10 to accomplish two objectives, including (1) the achievement and maintenance of a selected temperature setpoint within the conditioned space 4, and (2) the driving of the motor/alternator 31 at a sufficient rpm so that the alternator provides enough current to the battery charger 33 to recharge the system battery (not shown), and the fan 35 drives a sufficient volume of air through the evaporator-heater coils 12, 23 to uniformly cool the conditioned space 4.

To achieve the first of these objectives, the CPU constantly monitors the temperature of both the discharge air via sensor 90, the return air via sensor 32, and compares these readouts with the temperature setpoint of the conditioned space 4 selected in its software. In achieving the setpoint goal, CPU 80 follows an algorithm designed to rapidly reach such a setpoint with a minimum expenditure of cryogen while at the same time avoiding unnecessary overshooting or other conditions that could result in destructive top-freezing of items stored within the space 4. In achieving its second goal, it rectifies the AC output of the alternator of the motor/alternator 31 and converts this output into shaft rpms. It then proceeds to compare the actual rpms with the minimum number of rpms necessary to recharge the system battery via recharger 33, and move sufficient air through the evaporator-heater coils 12, 23 via fan 35. If the measured rpms is less than the minimum number of rpms necessary to achieve these goals, it incrementally opens electronically controlled valve 10 to a position that ultimately raises the rpms to at least the minimum number.

In operating the system 3 in the heating mode (which may be done to either defrost the evaporator-heater coils 12, 23, or to heat the conditioned space 4), the CPU 80 opens fuel valve 76 and proceeds to actuate nozzle 66 of the propane burner 64. It then opens mode valve 46 and closes mode valve 13 so that all of the cryogen exiting the tank 6 flows into the vaporizer and superheater device 48 via conduit 44. The cryogen flowing through conduit 44 first flows through the vaporizer coil assembly 50 and thence into the first superheating coil 52. From thence, the cryogen flows through conduit 11 and into the first vaporizer-heater coil 12. Because the CPU 80 has further switched the position of the three-way valve 15 from "cool" to "heat", cryogenic gas exiting the first coil 12 via conduit 14 is connected to conduit, 19 which leads it into the second superheating coil 54. From coil 54, superheated cryogenic gas is led into the second evaporator-heater coil 23 via conduit 21. Cryogenic. gas exiting coil 23 drives the motor/alternator 31 via conduits 25 and 30. Finally, instead of directing exhaust drive gas out of the motor/alternator 31 through the muffler 38, the computer opens recirculation valve 40 so that such gas may recirculate through the second superheating coil 54, thereby economizing on the amount of cryogen used to effect the heating mode.

In operating the system 3 in the heating mode, CPU 80 seeks to obtain four objectives, including (1) making sure that the cryogen exiting the vaporizer coil assembly 50 is above freezing; (2) insuring that the cryogen exiting the first superheating coil 52 is on the order of 500° F.; (3) achieving either a temperature on the coils 12, 23 sufficient to insure the defrosting of the same, or heating the conditioned space 4 to a temperature setpoint, and (4) driving the shaft of the motor/alternator 31 at a sufficient speed so that the recharger 33 is supplied with enough current to recharge the system battery, and the fan 35 circulates sufficient air in the conditioned space 4 to achieve the selected setpoint. In achieving these goals, the CPU looks to the readout of the temperature sensors 98 (which tells that the temperature of the cryogen exiting the vaporizer coil assembly 50) the temperature sensor 100 (which informs it of the temperature of the cryogen exiting the first superheating coil 52), the temperature sensors 84, 86 (which tell that the temperature of the cryogen exiting the coils 12, 23), the temperature sensors 90, 92 (which tell that the temperature of the discharge air and return air to the conditioned space 4, respectively) and the rectified output of the alternator of the motor/alternator 31 (which may be converted into motor shaft rpms. It then modulates the valve 10 to insure that the flow of cryogen entering the vaporizer and superheater device 48 is sufficient to achieve all of the aforementioned objectives.

Figure 2:
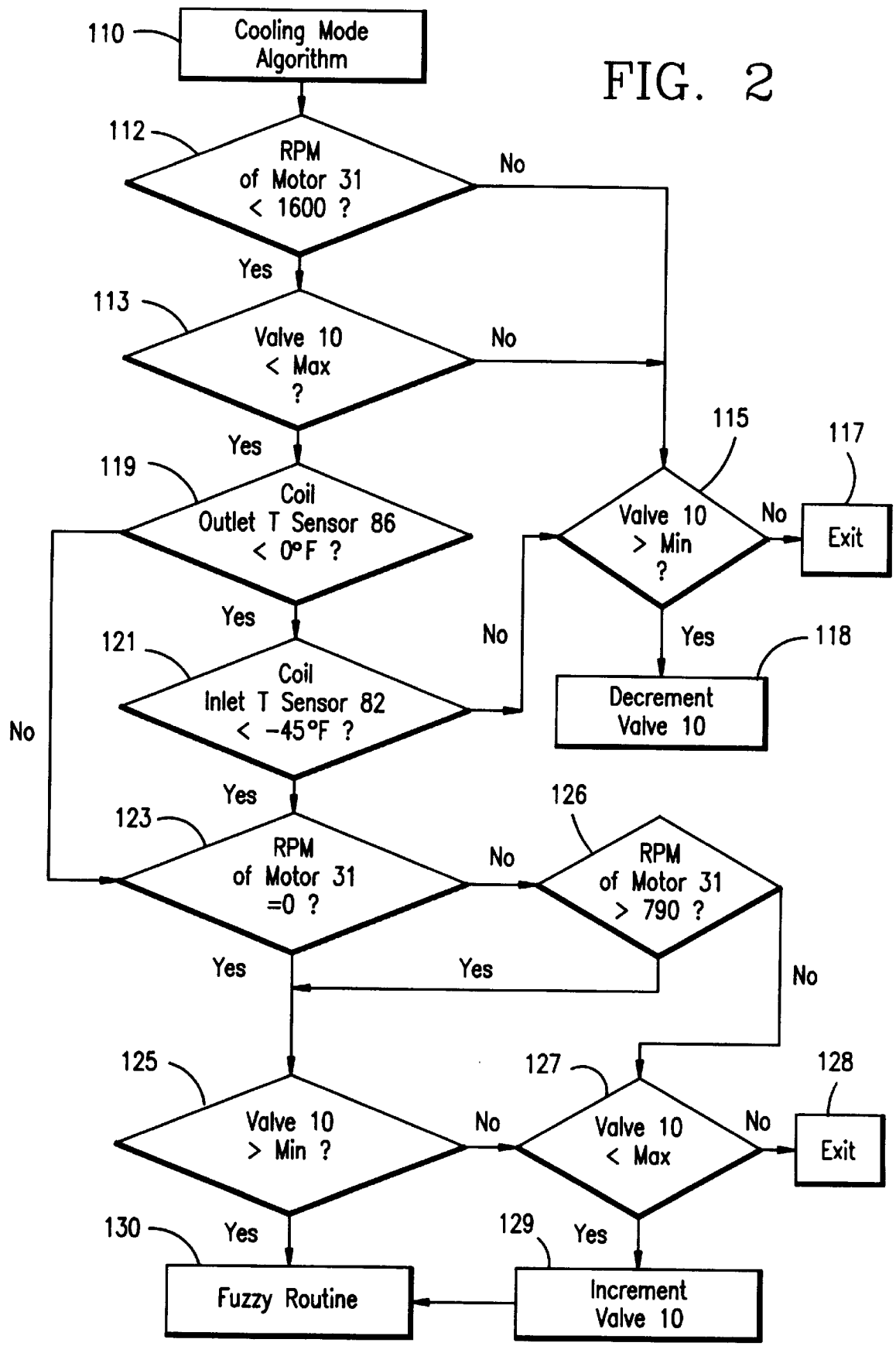
FIGS. 2 and 3 are flow charts of the heating and cooling mode algorithms used to implement the method of the invention.
Figure 3:
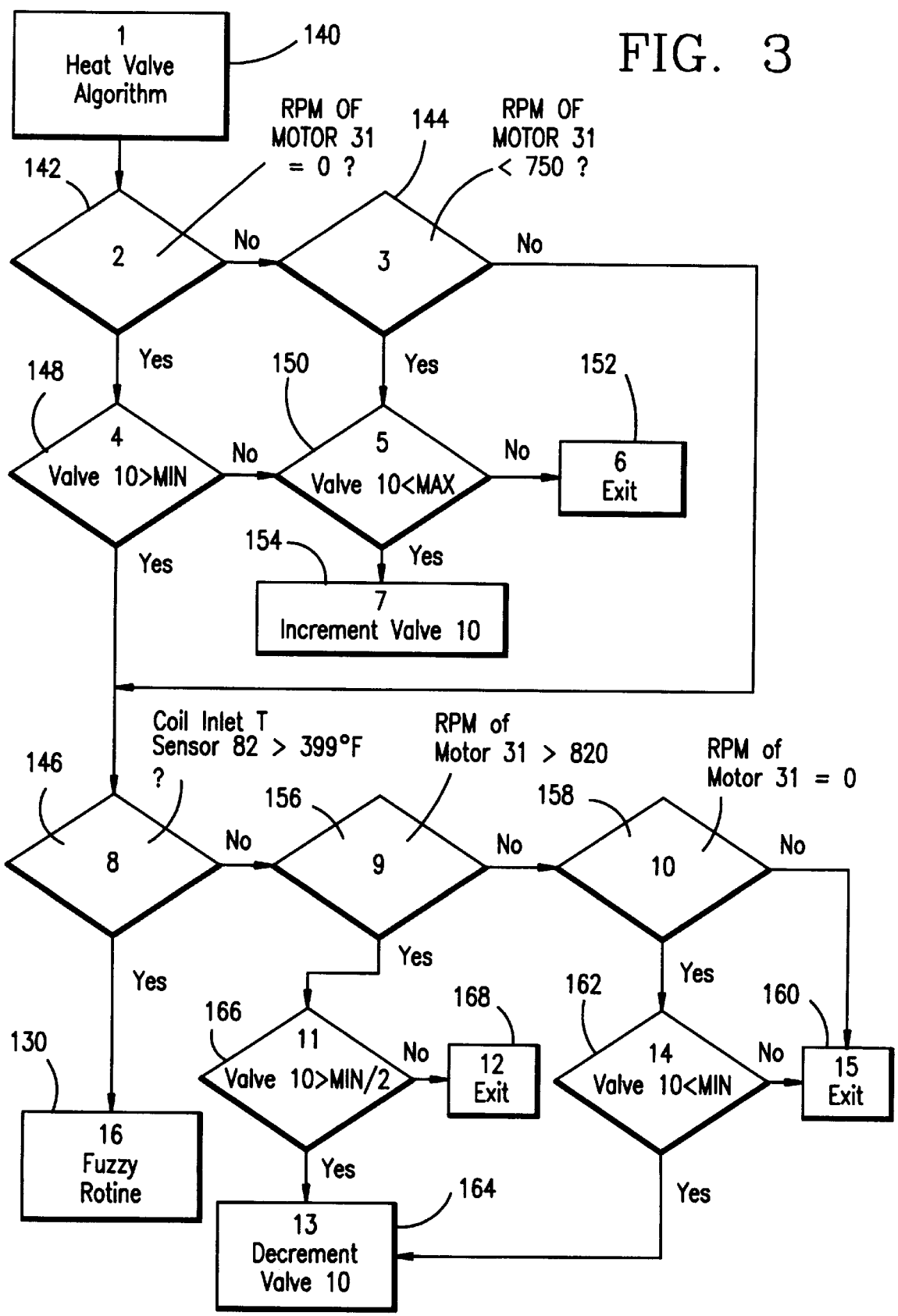

FIGS. 2 and 3 illustrate the heating and cooling modelalgorithms 110 and 140 that constitute the method of the invention. Each of the steps of both algorithms is, of course, implemented by the CPU 80.

The purpose of the cooling mode algorithm 110 illustrated in FIG. 2 is threefold. First, the algorithm 110 attempts to enter the refrigeration system 3 into the fuzzy routine block 130 with the rotational speed of the vapor motor/alternator over 790 rpms, which is the minimum speed necessary for adequate recharging of the battery of the system. Second, this algorithm 110 seeks to shut down the system in the event that the rotational speed of the vapor motor/alternator 31 exceeds 1600 rpms with the flow valve 10 being in a "closed" position, which of course would indicate some sort of error in the system. Finally, the algorithm 110 seeks to shut down the system 1 in the event that it detects that the cryogen entering the heater vaporizer coils 12,23 is greater than −45° F. Such an operating condition would indicate that the cryogenic tank 5 is out of cryogen, in which case the system 1 should be shut down.

The first two question blocks 112, 113, are directed toward the implementation of the first operational condition of the algorithm 110. In these blocks, the CPU 80 determines whether the speed of the vapor motor/alternator 31 is less than 1600 rpms, and whether the position of the flow valve 10 is less than its fully open or maximum position. If the answer to both of these questions is "no", then the CPU 80 proceeds to question block 115, and determines whether or not the flow valve 10 is open past its minimum position. If the answer to this question is "yes", then it proceeds to block 118 and begins decrement or to close the flow valve 10 in order to reduce the rotational speed of the motor/alternator 31 to below 1600 rpms. If the answer to the question of block 115 is "no", then the CPU 80 proceeds to block 117 and shuts down the system, as an operational error would have been clearly indicated.

Question blocks 119 and 121 implement the second operational condition of the system 1. Specifically, the CPU determines in question block 119 whether or not the coil outlet temperature is less than 0° F. If the answer to this question is "yes", then it proceeds to question block 121 and asks whether or not the coil inlet temperature is less than −45° F. If the answer to the question in block 121 is "no", then the CPU proceeds to question block 115 and from thence either to valve decrement block 118 or system shut-down block 117, depending upon whether or not the flow valve 10 is opened to an extent greater than its minimum opening. If the answer to the question posed in block 119 is "no", or the answer posed in question block 121 is "yes", then the CPU 80 proceeds to question block 123 and determines whether or not the rpms of the motor/alternator is greater than zero.

If the answer to the question block 123 is "yes", then the CPU 80 proceeds to question block 125 and determines whether or not the flow valve 10 has been opened to an extent greater than its closed or minimum position. If the answer to this question is "yes", then the CPU 80 proceeds to the fuzzy routine block 130, which is an alternate way of starting the system 1 up. If however, the answer to question block 123 is "no", then the CPU 80 proceeds to question block 126 and determines whether or not the rotational speed of the motor/alternator 31 is greater than 790 rpms. If the answer to this question is "yes", then the CPU 80 will again proceed to the fuzzy routine block 130 assuming that the flow valve 10 is at least partially open. If, however, the answer to the question posed in block 126 is "no", then the CPU will proceed to question block 127 and ask whether or not the flow valve 10 is open to a position less than its maximum. If the answer to this question is "yes", then the CPU proceeds to operational block 129, and incrementally opens the valve 110 in order to get the rotational speed of the motor/alternator 31 greater than 790 rpms. Once this condition has been fulfilled, it then proceeds to the fuzzy routine operational block 130. However, if the answer to the question posed in block 127 is "no", the CPU 80 proceeds to exit block 128, and shuts down the system since there is no way to increase the rotational speed of the motor/alternator by further opening the flow valve 10.

The heat valve algorithm 140 illustrated in FIG. 3 likewise insures that certain operational conditions are met before the CPU 80 implements the fuzzy routine 130. In particular, the CPU 80 determines via question blocks 142 and 144 whether or not the rotational speed of the motor/alternator 31 is greater than the 750 rpms. If so, the CPU proceeds to question block 146. However, if the rotational speed of the motor/alternator 31 is less than 750 rpms, the CPU proceeds to question block 150, and determines whether or not the flow valve 10 is open to less than its maximum extent. If the answer to the question posed in block 150 "yes", then the CPU proceeds to operational block 154 and incrementally opens the flow valve 10 in order to bring the rotational speed of the motor/alternator 31 to above 750 rpms. If, however, the answer to the question posed in block 150 is "no", the CPU 80 proceeds to operational block 152, and shuts the system 1 down.

In the event that the question posed in block 142 is "yes" and the rotational speed of the motor/alternator 31 is equal to zero, then the CPU proceeds to question block 148 and asks whether or not the flow valve 10 is open beyond its minimum extent. If the answer to this question is "no", it again proceeds to question block 150, and incrementally opens the flow valve 10 if this valve is less than fully open. If the valve is in fact fully open and the rotational speed of the motor/alternator 31 is zero, then the CPU again proceeds to operation block 152, and shuts the system down. If, however, the answer to the question posed in block 148 is "yes", then the CPU proceeds to question block 146.

At question block 146, the CPU inquires as to whether or not the inlet temperature sensor 82 detects a temperature greater than 399° F. If the answer to this question is "yes", then the CPU proceeds to the fuzzy routine operational block 130. However, if the answer is "no", then the CPU proceeds to question block 156. At this block, the CPU 80 determines whether or not the rotational speed of the motor/alternator 31 is greater than 820 rpms. If the answer is "no", it then asks whether or not the rotational speed of the motor is zero rpms at question block 158. The CPU 80 then proceeds to shut the system 1 down, whether the answer to the question posed in block 158 is "yes" or "no". Specifically, if the answer is "no", the CPU 80 proceeds to operational block 160, and shuts the system down. On the other hand, if the answer to this question is "yes", then it proceeds to question block 162, and determines whether or not the flow valve 10 is open to an extent less than its minimum. If not, then the system 1 again proceeds to shut down block 160. However, if the answer to the question posed in block 162 is "yes", then the CPU 80 proceeds to operational block 164, and decrements or closes the flow valve 10 to its minimum extent, since an error condition is clearly present.

Referring back to question block 156, if the answer to the question posed in this block is "yes", then the CPU 80 proceeds to question block 166. At block 166, the CPU 80 determines whether or not the flow valve 10 is half open. If "yes", then the CPU 80 proceeds to operational block 164, and decrements or closes the flow valve 10. If, however, to this question is "no", then the CPU 80 proceeds to operational block 168, and shuts down the system 1.

The fuzzy routine block 130 may best be understood with respect to the schematic diagrams illustrated in FIGS. 4, 5, 6, and 7.

FIG. 4 illustrates the operation of the block 130 when the difference ΔT between the measured temperature of the return air in the conditioned space 4 and the set point temperature is large (i.e., between 10° and 45°), or small (i.e., between 0° F. and 10° F.). Four different relationships are illustrated in this graph. Starting from the left side, the relationships between pull down versus too warm and too warm versus in range are shown. From the right hand side to the center, the relationships of pull up versus too cold, and too cold versus in range are shown. In all four relationships, the membership functions represent the difference between the measured temperature of the return air and setpoint temperature in the conditioned space 4 (ΔT) versus the "membership weighing" associated with the measured ΔT in the fuzzy logic between the sets of increment or decrement the electronically controlled valve 10 "a lot" versus "a little". As is evident from the symmetrical "X" shape of the graphs on either side of ΔT=0, the relative weight afforded between these two valve actions is inversely proportional to the extent to which the measured temperature approaches the set point temperature. Hence a large amount of weight (i.e. "1") will be afforded to the command "change valve 10 a lot" when the measured temperature is plus or minus 45° away from the desired set point temperature, while a minimum amount of weight (i.e., "0") will be afforded to this command when the measured temperature is ±10° F. from set point temperature.

FIG. 5 is essentially an expansion of that portion of the weighing diagram illustrated in FIG. 4 in the region where the measured temperature is ±10° away from the set point temperature. While the linguistic commands associated with a de-fuzzification of this diagram are the same (i.e., change valve 10 a little versus a lot) between 10° and 1.5° away from set point, the scale of the incrementation or decrementation of the valve 10 changes. For example, if the de-fuzzified change "a lot" command for the valve 10 at ±45° F. from set point amount to eight increments or decrements per 0.10 seconds, the scale of this same defuzzified command at ±10° F. may amount to only four increments or decrements per 0.10 seconds. Finally, as is indicated in the zone between 0 and ±1.5° F. of FIG. 5, the command to increment or decrement valve 10 "a lot" versus "a little" might translate to incrementing or decrementing the valve 10 only one step every 0.10 second versus zero steps.

FIG. 6 illustrates four different relationships which are fundamentally different than the relationships illustrated in the diagrams of FIGS. 4 and 5. Each of these four relationships is dependent upon the measured rate of change of the temperature of the discharge air of the conditioned space 4, and include fast warming versus slow warming, slow warming versus no change, fast cooling versus slow cooling, and slow cooling versus no change. In the "fast warm" and "fast cool" regions of this diagram, the outstanding command generated by the control system is to increment or decrement the flow control valve 10 "a lot". However, the scale of increment or decrement "a lot" in this diagram corresponds to the scale used in FIG. 5 (i.e., "a lot" is half as much as the "a lot" used in FIG. 4). When the rate of temperature change is ±0.3° per second to ±0.1° F. per second, the valve incrementing or decrementing command is weighed between change "a lot" versus change "a little", which commands may correspond to four increments or decrements per 0.1 seconds versus 1 increment or decrement every 0.1 seconds. Finally, in the range of change between ±0.1° F. per second versus no change, the valve opening or closing commands are weighed between one increment or decrement every 0.1 second, and no increments or decrements per 0.1 seconds.

FIG. 7 schematically illustrates four additional fuzzy logic relationships which are used to control the incrementation or decrementation of flow control valve 10. Each of these relationships is dependent upon the deceleration or acceleration in the measured rate of change of the temperature of the return air in the conditioned space 4. These relationships include fast deceleration of the rate of change of the measured temperature versus slow deceleration, slow deceleration of this rate versus no change, fast acceleration of this rate versus a slow acceleration thereof, and slow acceleration of this rate versus no change. When the deceleration or acceleration of the rate of change of the measured temperature is fast (i.e., ±0.20° F./second$^2$), full weight is given to the command to increment or decrement the flow control valve 10 "a lot" (i.e., on the same scale as in FIG. 5, or four increments or decrements per 0.10 seconds). When the acceleration or deceleration of the measured rate of temperature is slow (i.e., ±0.02° F./second$^2$), then full weight is given to the command to increment or decrement the flow control valve slowing, i.e., one incrementation or decrementation per 0.10 seconds. When the rate of deceleration or acceleration is slowed to constant, then the command to increment or decrement the valve 10 is weighted between one incrementation or decrementation per 0.10 seconds and no incrementation or decrementation at all.

In order to insure smoothness, and rapid response to changing conditions without overshooting which can cause an unwanted flooded of the evaporator coil 12 and 23, primary weight is given to the commands generated by the relationships illustrated in FIG. 4 when the difference between the set point temperature and the measured temperature of the discharge air is between ±45°, and ±10°. When this difference is reduced to between ±10° and ±5°, the incrementation or decrementation command generated by the relationships illustrated in FIG. 5 predominate. When the temperature difference is between ±5° and ±2°, the incrementation or decrementation commands generated by the relationships illustrated in FIG. 6 predominate. Finally, when the temperature difference is less than ±2° F., the incrementation or decrementation commands generated by the relationships illustrated in FIG. 7 predominate.

What is claimed:

1. A control method for a cryogenic refrigeration system of a type having an evaporator-heater coil, an electronically controlled valve for regulating a mass flow of cryogen to said evaporator-heater coil, a vapor motor driven by said cryogen coupled to both an alternator for recharging a battery, and a fan for generating a discharge air flow through said coil and into a conditioned space, comprising the steps of:

determining the shaft rpms of the vapor motor by a rectified output of said alternator;

incrementing or decrementing said electronically controlled valve so that said shaft rpms are above a preselected amount associated with recharging a battery, and with circulating a sufficient amount of air in said conditioned space via said fan to avoid substantial temperature non-uniformities in said conditioned space;

determining a difference between a measured temperature associated with said system and a set point temperature, and incrementing or decrementing said electronically controlled valve by an amount determined by said difference between said measured temperature and set point temperature.

2. The control method of claim 1, wherein the measured temperature is the temperature of return air in the conditioned space.

3. The control method of claim 2, wherein said temperature of said return air is periodically measured every 0.10 seconds, and said electronically controlled valve is periodically incremented or decremented every 0.10 seconds.

4. The control method of claim 2, wherein said temperature of said return air is periodically measured every 0.10 seconds, and said electronically controlled valve is periodically incremented or decremented every 0.10 seconds.

5. The control method of claim 1, further comprising the step of determining the rate of change of said measured temperature, and wherein said electronically controlled valve is incremented or decremented by an amount determined in part by said rate of change of said measured temperature, and in part by said difference between said measured temperature and set point temperature.

6. The control method of claim 5, wherein said electronically controlled valve is periodically incremented or decremented by an amount determined substantially by the difference between said measured temperature and said set point temperature when said difference is between about 45° F. and 5° F.

7. The control method of claim 6, wherein said electronically controlled valve is periodically incremented or decremented at an amount corresponding to a weighted average between a "change much" amount and a "change moderately" amount when said difference is between about 45° F. and 10°.

8. The control method of claim 7, wherein said electrically controlled valve is periodically incremented or decremented at an amount corresponding to a weighted average between a "change moderately" amount and a "change little" amount when said difference is between about 10° and 2° F.

9. The control method of claim 5, wherein said electronically controlled valve is periodically incremented or decremented by an amount determined substantially by the rate of change of the temperature of the return air when said difference between said measured temperature and set point temperature is between about 5° F. and 2° F.

10. The control method of claim 9, wherein said electronically controlled valve is periodically incremented or decremented by an amount corresponding to a weighted average between a "change much" amount and a "change little" amount depending upon whether said rate of change is greater or less than 0.3° F. per second.

11. The control method of claim 5, further comprising the step of determining the rate of acceleration and deceleration in said rate of change of said measured temperature, and wherein said electronically controlled valve is incremented or decremented also in part by said rate of acceleration or deceleration.

12. The control method of claim 11, wherein said electronically controlled valve is periodically incremented or decremented by an amount determined substantially by the acceleration or deceleration in the rate of change of the temperature of the return air when said difference between said measured temperature and set point temperature is no more than 2° F.

13. The control method of claim 12, wherein said electronically controlled valve is periodically incremented or decremented by an amount corresponding to a weighted average between a "change much" amount and a "change little" amount depending upon whether said acceleration or deceleration in the rate of temperature change is 0.2° F. per second$^2$.

14. The control method of claim 11, wherein said electronically controlled valve is periodically incremented or decremented by an amount determined substantially by the acceleration or deceleration in the rate of change of the temperature of the return air when said difference between said measured temperature and set point temperature is no more than 2° F.

15. The control method of claim 4, wherein said electronically controlled valve is periodically incremented or decremented by an amount determined substantially by the rate of change of the temperature of the return air when said difference between said measured temperature and set point temperature is between about 5° F. and 2° F.

16. The control method of claim 4, further comprising the step of determining the rate of acceleration and deceleration in said rate of change of said measured temperature, and wherein said electronically controlled valve is incremented or decremented also in part by said rate of acceleration or deceleration.

17. A control method for a cryogenic refrigeration system of a type having an evaporator-heater coil, an electronically controlled valve for regulating a mass flow of cryogen to said evaporator-heater coil, a vapor motor driven by said cryogen, and a fan for generating a discharge air flow through said coil and into a conditioned space, comprising the steps of:

periodically determining a difference between a measured temperature of return air in said conditioned space and a set point temperature;

periodically determining a rate of change of said measured temperature, and periodically incrementing or decrementing said electronically controlled valve by an amount determined partially by said difference between said measured temperature and set point temperature and partially by said rate of change of said measured temperature.

18. The control method of claim 17, wherein said electronically controlled valve is periodically incremented or decremented by an amount determined substantially by the difference between said measured temperature and said set point temperature when said difference is between about 45° F. and 5° F.

19. A control method for a cryogenic refrigeration system of a type having an evaporator-heater coil, an electronically controlled valve for regulating a mass flow of cryogen to said evaporator-heater coil, a vapor motor driven by said cryogen, and a fan for generating a discharge air flow through said coil and into a conditioned space, comprising the steps of:

determining the shaft rpms of the vapor motor by a rectified output of said alternator;

incrementing or decrementing said electronically controlled valve so that said shaft rpms are above a preselected amount associated with recharging a battery;

measuring the pressure of the cryogen entering said vapor motor;

incrementing or decrementing said electronically controlled valve so that said measured pressure that will maintain said cryogen is an exclusively gaseous phase in said vapor motor and said heater-evaporator coil;

determining a difference between a measured temperature associated with said system and a set point temperature;

determining a rate of change of said measured temperature;

determining an acceleration or deceleration in said rate of change of said measured temperature, and incrementing or decrementing said electronically controlled valve by an amount determined in part by said difference between said measured temperature and set point temperature, in part by said rate of change of said measured temperature, and in part by said acceleration and deceleration in said rate of change of said measured temperature.

* * * * *